DATA TRANSFER SYSTEM

Filed Nov. 9, 1961 7 Sheets-Sheet 1

INVENTORS
JOHN H. SORG JR.
JAMES D. CALVERT

BY Robert W. Berray

ATTORNEY

FIG. 6A ERROR POSITION
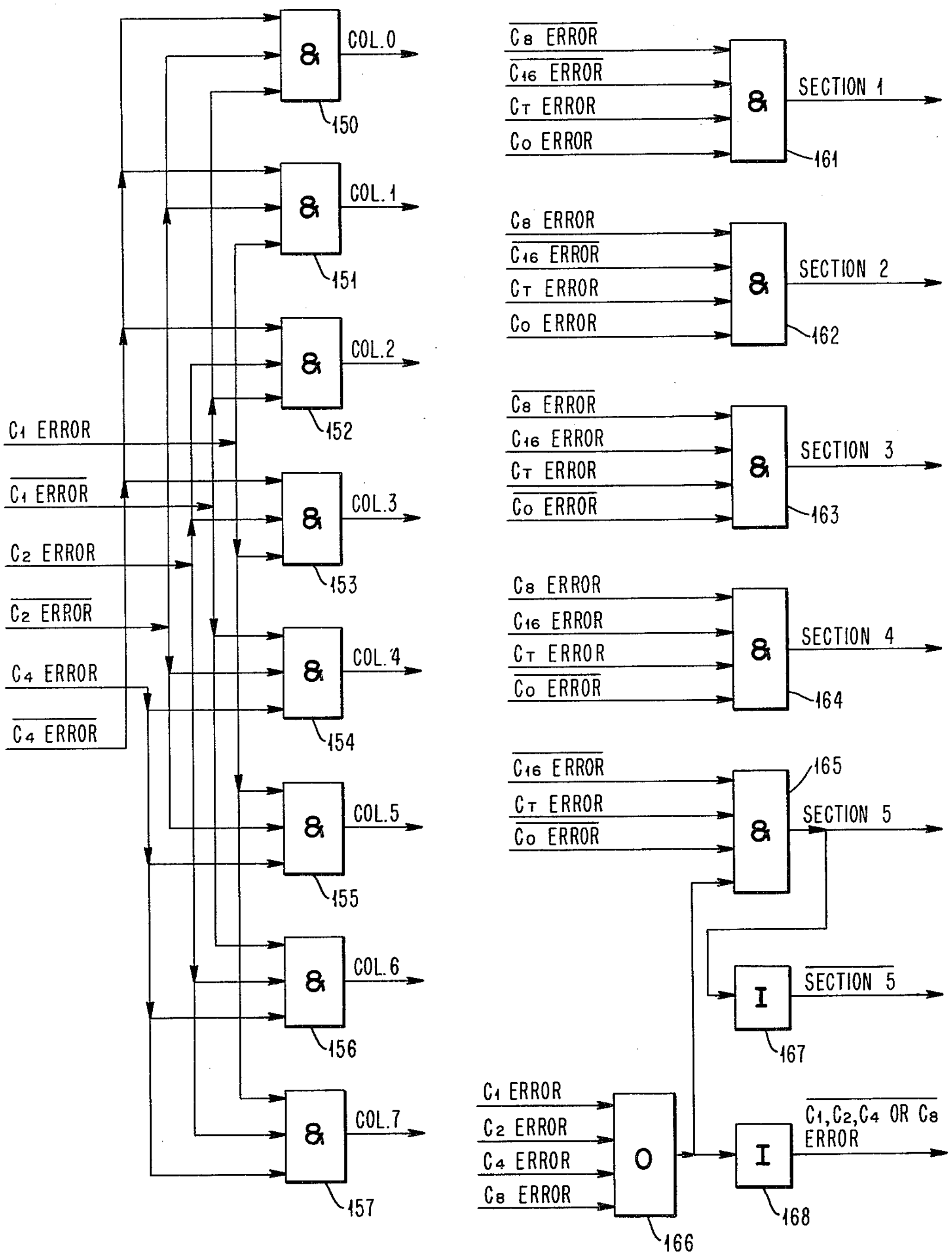

DATA TRANSFER SYSTEM

Filed Nov. 9, 1961 7 Sheets-Sheet 5

FIG. 6C
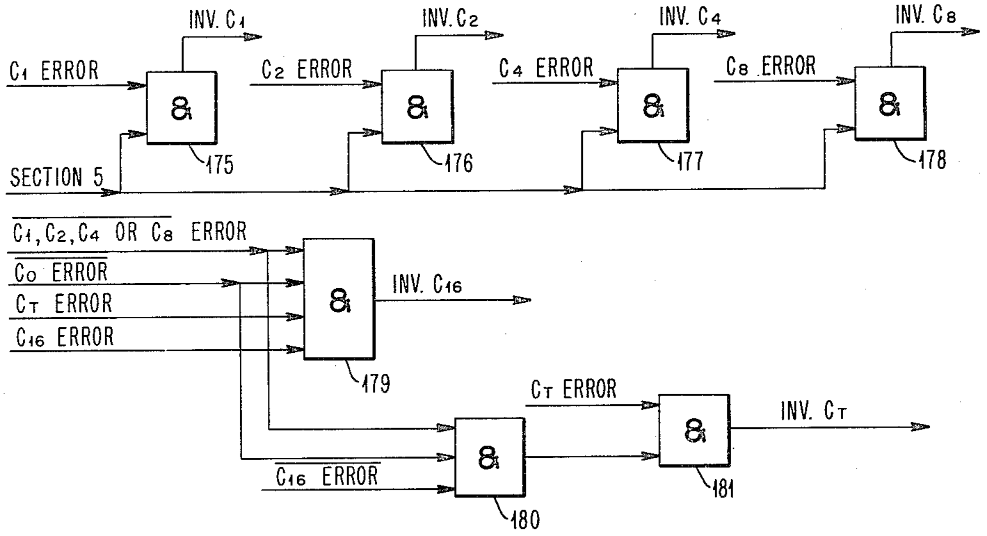
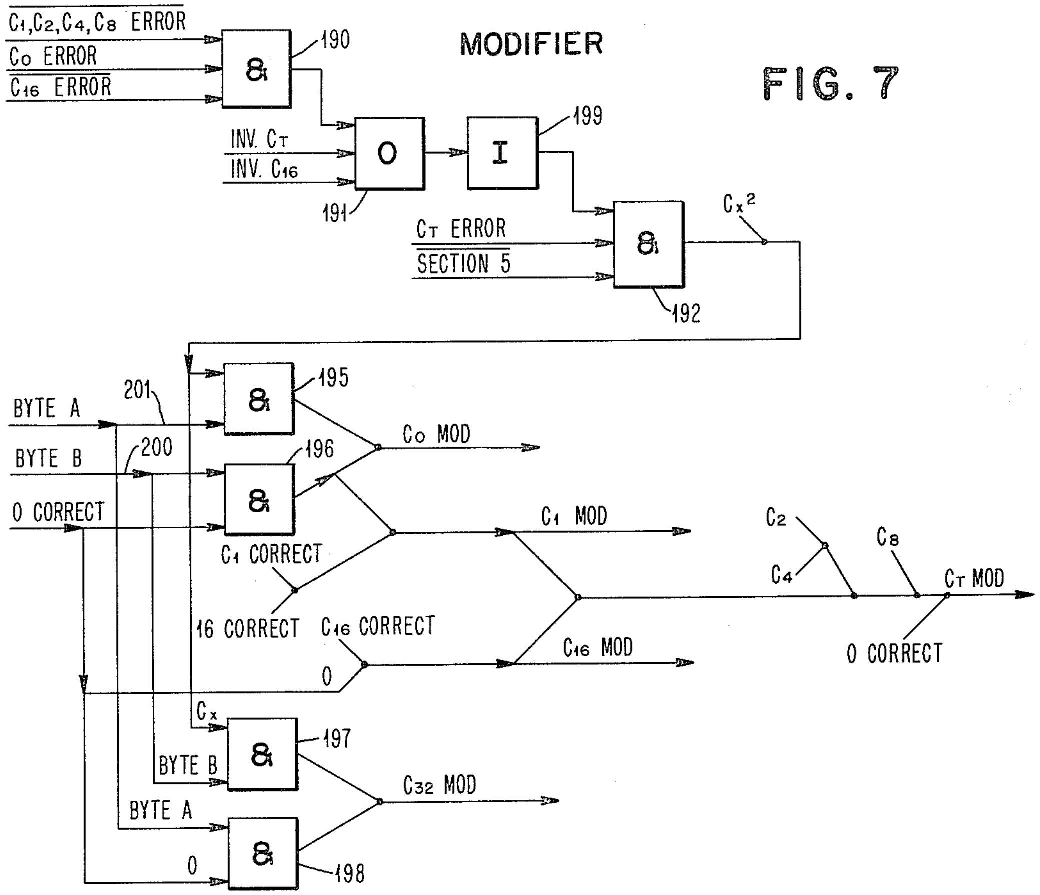

3,218,612
Patented Nov. 16, 1965

3,218,612
DATA TRANSFER SYSTEM

John H. Sorg, Jr., Poughkeepsie, and James D. Calvert, Wappingers Falls, N.Y., assignors to International Business Machines Corporation, New York, N.Y., a corporation of New York Filed Nov. 9, 1961, Ser. No. 151,247
7 Claims. (Cl. 340—172.5)

This invention relates to a data transfer system and more particularly to a transfer system wherein a computer word made up of a plurality of binary elements including check bits giving error correcting capabilities to the computer word is transferred by portions wherein the portions have error correcting check bits for correcting the portions and further wherein the check bits of the portions have a direct relationship with the check bits of the total computer word.

In large scale computing systems, it is often desirable to have a peripheral unit providing very high capacity storage for data. Quite often the computer is capable of operating on a computer word having a large number of binary elements but the peripheral storage unit may not be capable of storing the complete computer word in a single address location. It then becomes necessary to store the complete computer word by transferring it as a series of smaller portions. These portions, often referred to as "bytes" usually have the same number of binary elements, and it is these bytes which are taken from the complete computer word and stored in the peripheral storage device. When a particular data word is required in the computer, the bytes are taken sequentially from the high capacity storage device and reassembled into the complete computer word.

To provide greater reliability during the transfer of binary data, many systems provide the computer word with a plurality of binary check bits which accompany the data code group for detecting and correcting errors caused during the transmission. These systems most generally use an error correcting coding technique disclosed in Re. 23,601—"Error Detecting and Correcting System"—R.W. Hamming et al. It is not only important to insure that the entire computer word with its associated check bits is correct prior to breaking the word into bytes, but it is also important that each byte transferred to the high capacity storage be provided with an error correcting check bit combination to insure proper transfer.

The importance of providing error correcting check bits with each byte as transferred to the high capacity storages is apparent when considering the reverse transfer and assembly of the computer word. If a single channel between the high capacity storage and the assembly circuitry is in error, once the entire computer word has been assembled, a plurality of errors will have been caused necessitating a much more complex error correcting scheme. If each byte is corrected for at least any single error during the transfer from the high capacity storage, then an error caused by a faulty channel will be corrected for each byte before being assembled in the word register and multiple errors will not result in the word register.

In the known use of the Hamming checking scheme, the system just proposed would require a separate Hamming check bit generator for generating the check bits of the entire computer word and a separate Hamming check bit generator would be required for each of the bytes prior to transfer to the high capacity storage. In the normal Hamming checking scheme, there would be no relationship between the error correcting check bits of the bytes and the error correcting check bits of the entire computer word.

It is an object of this invention to provide circuitry for transferring a computer word between a computer and a high capacity storage wherein the computer word is transferred as a plurality of bytes.

It is a further object of this invention to provide for transfer of a computer word from a computer to a high capacity storage by transferring the word as a plurality of bytes wherein error correcting check bits are generated for each of the bytes prior to transfer to the high capacity storage.

Another object of this invention is to provide circuitry for generating error correcting check bits for each byte of a computer word prior to transfer to a high capacity storage wherein the error correcting check bits of all bytes of a computer word have a direct relationship with error correcting check bits which accompanying the entire computer word.

It is an additional object of this invention to provide error correcting check bit generating means for each byte of a computer word prior to transfer of the word from a computer to a high capacity storage wherein a logical combination of the error correcting check bits of all the bytes of a computer word results in a set of error correcting check bits which correspond to the set of error correcting check bits of the entire computer word.

Another object of the invention is to provide circuitry by which transfer of a computer word from high capacity storage to a computer may be accomplished by sequentially transferring a byte of the computer word with associated error correcting check bits giving single error correcting properties to the byte, and further wherein once all of the bytes of a computer word have been assembled in a word register, a logical combination of the error correcting check bits of all the bytes, as corrected, results in the proper set of error correcting check bits for the entire computer word for use in the computer.

These and other objects of this invention are attained in a specific embodiment thereof wherein all binary elements of a computer word are transferred to a high capacity storage device as a series of portions or bytes of the computer word. Before transfer of each byte to the high capacity storage, a set of error correcting check bits are generated for the particular byte. The binary elements of the byte and the associated check bits are then transferred to the high capacity storage. The check bits thus generated for each byte are stored in a logical array. When all bytes of the computer word have been transferred, and all the error correcting check bits of these bytes logically combined, a correspondence results between the combined byte check bits and the error correcting check bits which originally accompanied the computer word. A combination of the generated byte check bits and the word check bits will provide an indication of error in the formation of the bytes and associated error correcting check bits.

During the reverse process, when a computer word is to be assembled from the bytes stored in the high capacity storage, each byte and its associated error correcting check bits is tested for errors and the result of this test will provide correction of the data elements and error correcting check bits of the byte. When each byte has been corrected, the data elements are transferred to a corresponding position in the word register. The error correcting check bits of each of the bytes are then stored in a logical array. When all bytes of the computer word have been received and corrected, if necessary, the logical combination of all the error correcting check bits will result in a set of error correcting check bits which are proper for the entire assembled computer word. These error correcting check bits may then be transferred with the entire computer word for use in the computer system.

The foregoing and other objects, features and advantages of the invention will be apparent from the following more particular description of a preferred embodiment of the invention, as illustrated in the accompanying drawings.

Figure 6B:
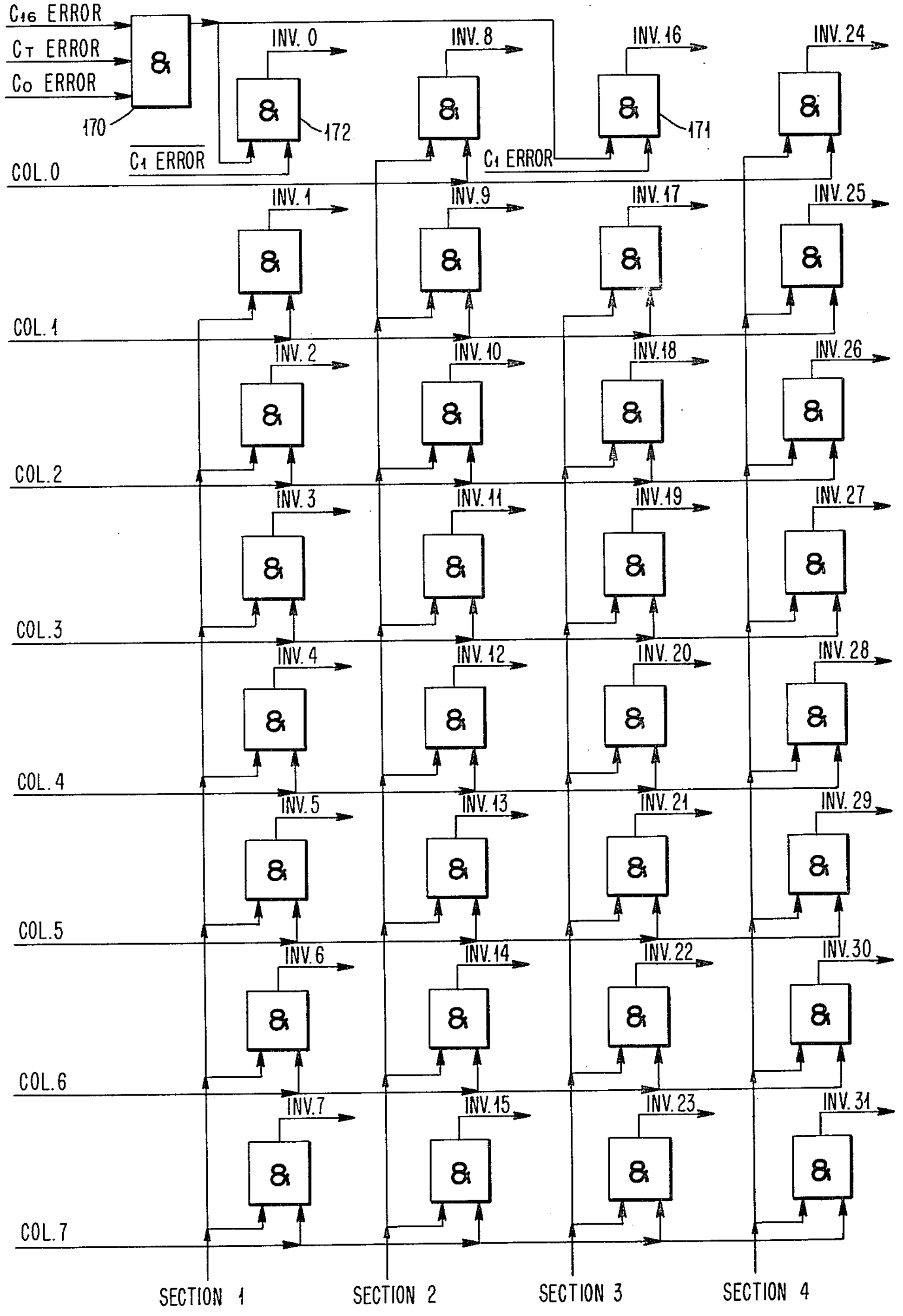
Figure 8:
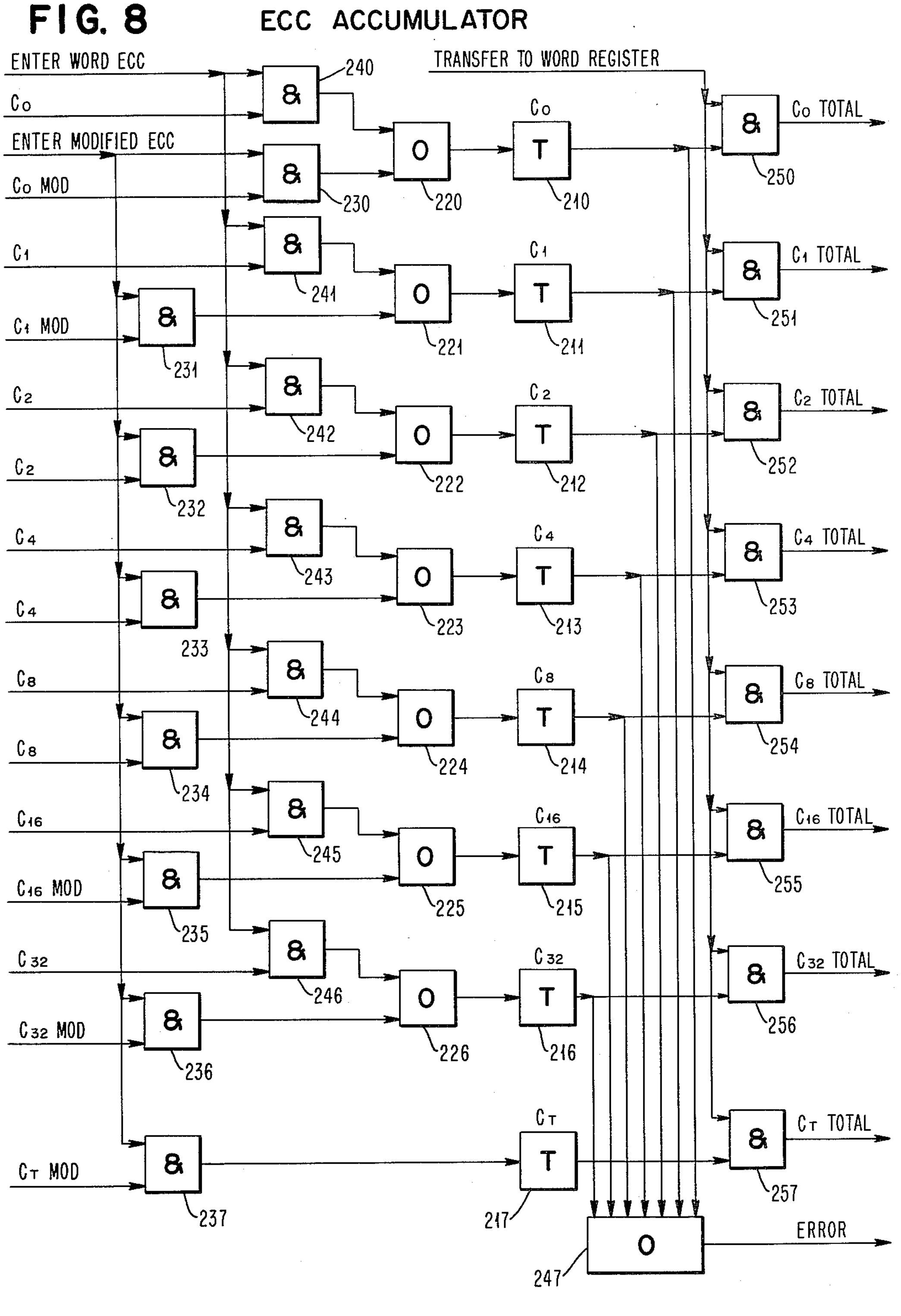

FIGURES 6*a*, 6*b* and 6*c* show the logic required for locating and correcting errors in the bytes as received from a high capacity storage;

FIGURE 7 is a schematic representation of the logic required to modify some of the check bits of each of the bytes as received from the high capacity storage to provide a correspondence with the check bits of the entire computer word;

FIGURE 8 is a schematic representation of the logic required for combining the check bits of all of the bytes of the computer word to produce the check bits which are proper for the entire computer word and means by which the combined byte check bits may be compared with the check bits of the entire computer word during the transfer of data from the computer to the high capacity storage.

Figure 1:
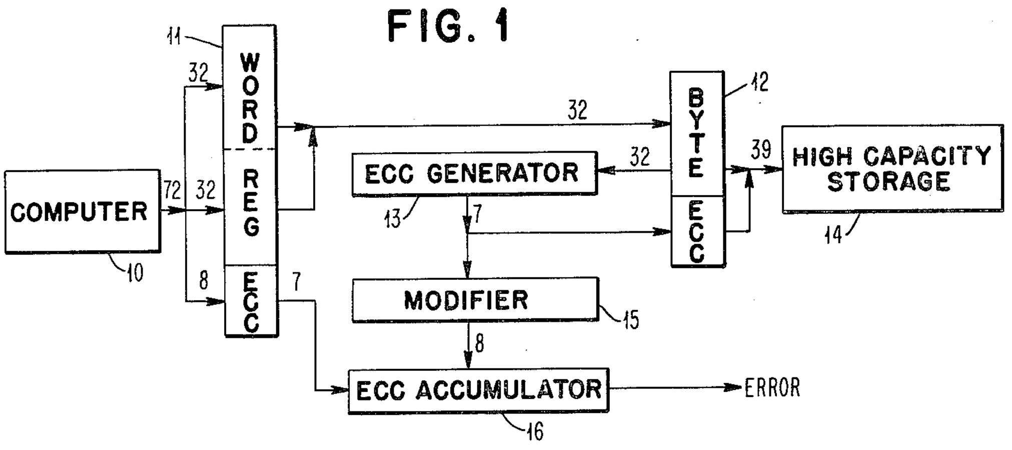
FIGURE 1 represents the major components necessary for transferring a computer word from a computer to a high capacity storage.
Figure 2:
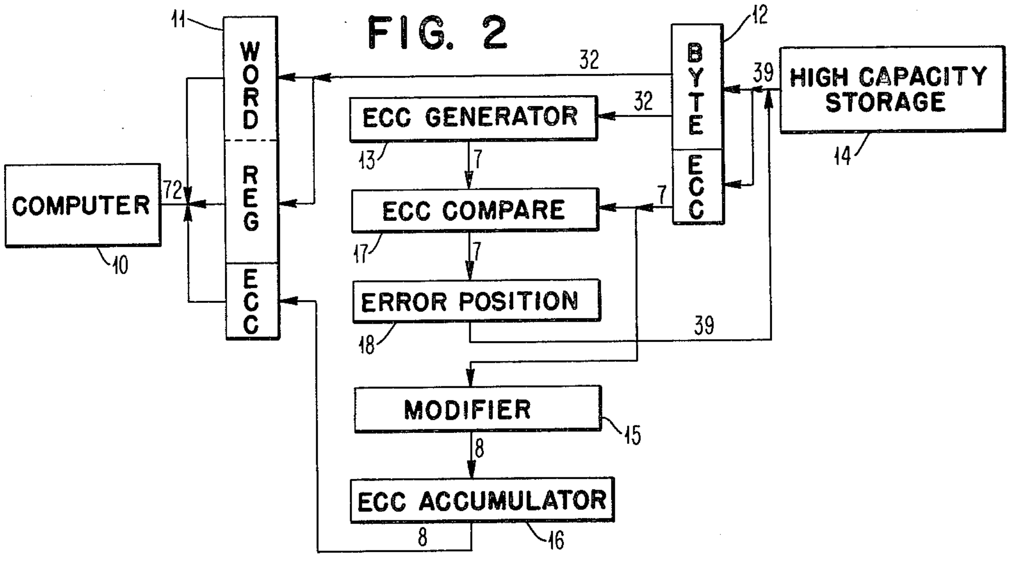
FIGURE 2 represents the major components necessary when transferring a computer word from the high capacity storage to the computer.
Figure 3:
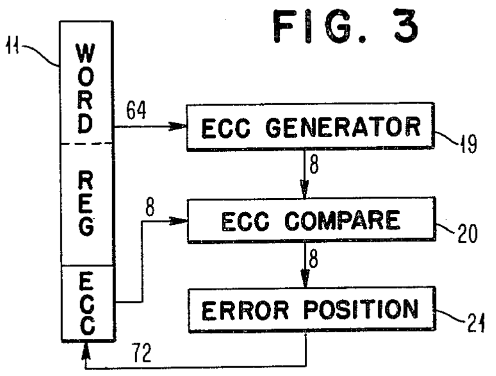
FIGURE 3 represents the major components necessary to provide added reliability for correction of errors in a computer word.

*FIGURES 1, 2 and 3—Major components and functions*

The function of transferring a computer word from a computer to a high capacity storage by transferring the word in a series of bytes is shown in FIGURE 1. In the specific embodiment shown, a computer 10 presents to a word register 11 seventy-two binary elements, of which 64 represent data and 8 error correcting check bits. The 64 data elements are then sequentially transferred as two bytes, to be referred to as Byte A and Byte B to a byte register 12. The registers 11 and 12 may be any of several types which include a bistable device to receive and store each binary element of a group. When each byte is received at byte register 12, the 32 data elements are used in the ECC (Error Correcting Code) generator 13 for generating 7 check bits required to provide error correcting properties for the byte. These check bits are taken from the ECC generator 13 and placed with the byte in byte register 12 for transfer as a 39 element word to the high capacity storage 14.

The error correcting check bits generated for each byte are then applied to a modifier 15 in which the error correcting check bits for each byte are modified to provide a relationship to the error correcting check bits of the entire computer word. The modified check bits from the modifier 15 are sent to an ECC accumulator 16. When the error correcting check bits for each of the bytes has been generated, modified and placed in the ECC accumulator 16, the ECC accumulator 16 should contain check bits identical to the error correcting check bits originally placed in the word register 11. The computer word check bits from word register 11 are compared with the accumulated byte check bits so that a non-comparison will provide an error signal for use by the computer system.

FIGURE 2 shows the major components and functions required for transferring by two bytes, an entire computer word from the high capacity storage 14 to the computer 10. Means are provided wherein the error correcting check bits for the computer word are generated by the combined check bits of the bytes and for correcting any single errors which may occur in the transfer of a byte from the high capacity storage 14 to the byte register 12. The first byte of a computer word is received in byte register 12 from the high capacity storage 14. The 32 data elements received are applied to the ECC generator 13 and the check bits thus generated are sent to an ECC compare unit 17. The error correcting check bits which accompanied the byte to byte register 12 are sent to the compare unit 17. A non-comparison of these check bits provides an indication of error which is applied to an error position unit 18. The 39 outputs of the error position unit 18 are sent to the byte register 12 to invert any single element in the byte register 12 which is in error. When the byte and corresponding check bits has been corrected in byte register 12, the error correcting check bits are sent to the modifier 15 for modification from the byte check bits to the word check bits, and the modification thus achieved is sent to the ECC accumulator 16. The second byte and associated error correcting check bits are received in byte register 12 and the same process is repeated. When both bytes have been received and assembled in the word register 11, the error correcting check bits accumulated in the accumulator 16 are the proper error correcting check bits which should accompany the entire computer word into the computer system 10.

Added reliability may be achieved for the system by providing the major components shown in FIGURE 3. Transfer of the entire computer word to the word register 11 from either the computer 10 or byte register 12 may be checked by generating error correcting check bits in the ECC generator 19 based on the 64 data bits in the word register 11. These check bits, thus generated in generator 19, are compared in the ECC compare unit 20 with the error correcting check bits which accompany the computer word. A non-comparison will provide from the error position unit 21, an inverting signal for any single element in error.

*FIGURE 4—The code*

Figures 4A, 4B, 4C:
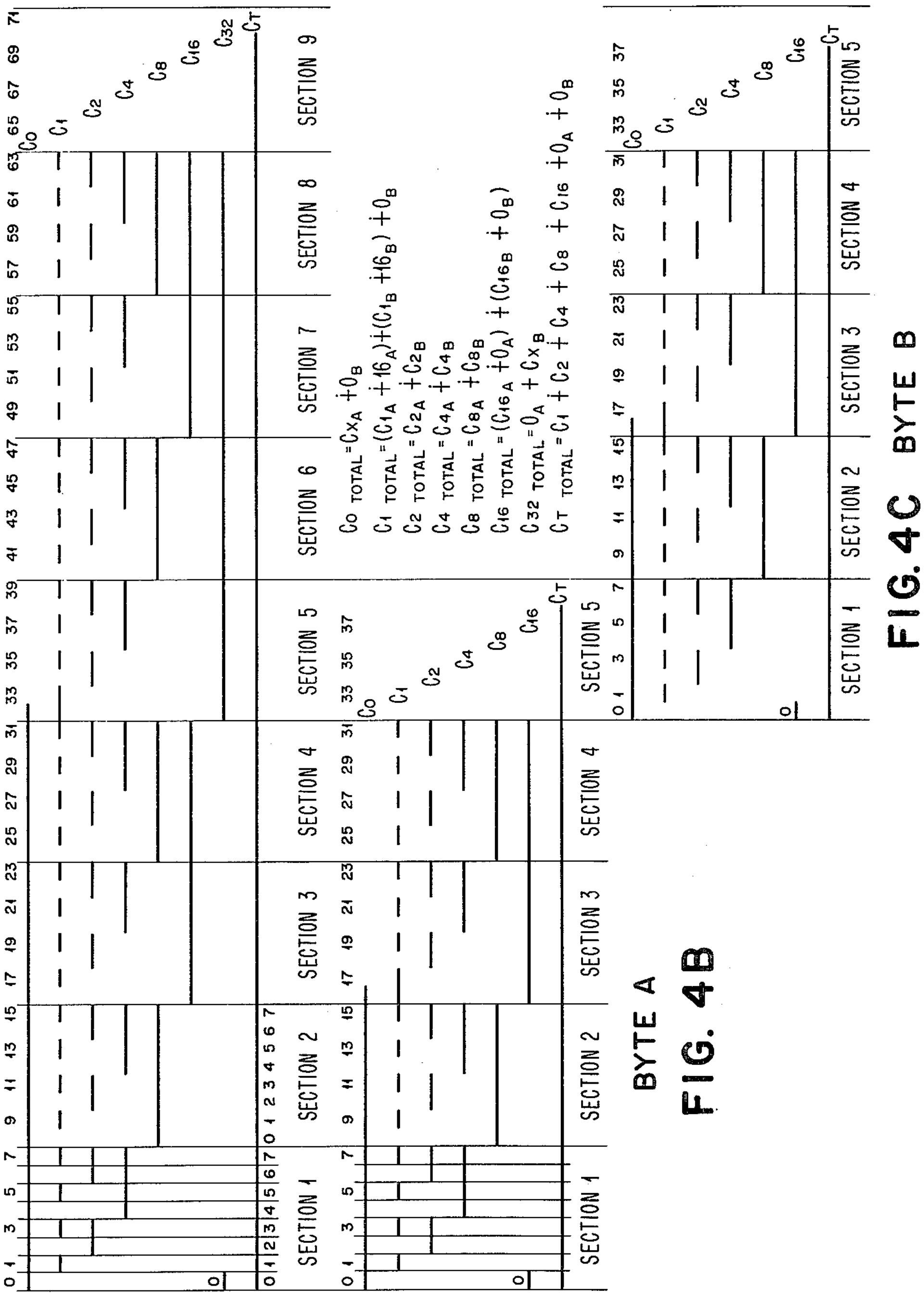
FIGURE 4 is a schematic representation of the coding scheme used for generating error correcting check bits for the entire computer word and for portions or bytes of the computer word and further shows their relationships.

FIGURE 4*a* is a representation of an entire 72 binary element computer word used in the specific embodiment of the invention. The data portion of the word, which contains 64 elements, is in positions 0–63, and the error correcting check bits take up positions 64–71. The error correcting check bits are identified as C0, C1, C2, C4, C8, C16, C32 and CT. Each of these check bits is generated in accordance with an even parity or Sum Modulo 2 addition of a unique combination of the data elements. With slight modification known in the art, odd parity relationships could be used. The combinations of data elements for generating each of the check bits is represented by a solid line spanning the information elements in the combination.

The entire computer word has been divided into 9 bytes of 8 bits each. The 9 bytes have been identified as Section 1–Section 9. The 8 binary elements of each of the sections are identified as Column 0 through Column 7. This code is such that the combination of check bits C1, C2 and C4 can identify a particular column of any of the sections which is in error. The combination of check bits C0, C8, C16 and C32 are capable of identifying a particular section which has an error. The check bit CT provides an overall parity for the entire computer word including the error correcting check bits. A study of FIGURE 4*a* shows that each data position is affected by a combination of check bits whose binary sum indicates the position in error, except for the special case of positions 0 and 32. Any single bit error in the data portion of the word will change the CT check bit as well as at least two other check bits which indicate the position in error. Any single bit error in the check bits will change CT as well as the bit in error.

The main advantage of the error correcting code is that it may be easily generated on a serial by byte basis. The standard Hamming code does not lend itself to simple generation on a byte basis. Since the Hamming code check bits effectively occupy word positions intermixed with data, the word can not be divided symmetrically. In other words, corresponding bits of successive bytes of true data do not affect the same check bits. The code shown in FIGURE 4*a* removes the check bits from the data portion of the word and is arranged so that each 8 bit group has the same general check bit configuration except for two minor exceptions. Eight check bits are used and all of the error detecting and correcting features of the standard Hamming code remain.

Every data bit is included in at least three check bits. Data positions 0 and 32 are special cases and are handled separately. It can be seen that if complete symmetry were maintained, data positions 0 would only be included in check bit C0 and CT, and position 32 would only be included in check bit C32 and CT. If either check bit C0 or C32 was the only check bit in error, it would be impossible to determine whether the error was caused by the check bit itself or whether the error was caused by data bits 0 or 32 respectively. To alleviate this problem, position 0 is included in the generation of check bit C32 and position 32 in the generation of C1. Thus an error in data position 0 or 32 will cause an error indication in at least 2 check bits providing the necessary information to determine whether the error is in the check bit itself or in the data bit. If it were not desired to correct the check bits, the special case would not be required and complete symmetry would exist.

FIGURES 4*b* and 4*c* show the makeup of each half of the complete computer word. Byte A represented in FIGURE 4*b* comprises data positions 0–31 of the complete computer word, and a Byte B shown in FIGURE 4*c* comprises data positions 32–63 of the entire computer word. The error correcting check bits which accompany Byte A and Byte B occupy positions 32–38 of the 39 element word which is transferred to the high capacity storage. As was the case in FIGURE 4*a*, the dashed lines for each of the bytes represent the byte data positions which are used to generate its associated check bits. As was the case in FIGURE 4*a*, special cases are made of positions 0 and 16 of the bytes in order to distinguish between an error in these positions and check bits C0 and C16. The check bits which accompany each of the bytes are used to identify and locate errors in the bytes by again utilizing a division of the bytes into 5 eight-bit groups labeled Section 1–Section 5 wherein each of the sections includes 8 data bits labeled Column 0–Column 7.

The formulas shown with FIGURES 4*a*, 4*b* and 4*c* indicate the relationship between the check bits and data of each of the bytes with the entire computer word. The representation $CX_A$ and $CX_B$ represents an overall parity of the data elements only for each of the Bytes A and B respectively. As an example of this relationship, it can be seen that check bit $C0_{TOTAL}$ of the entire computer word can be generated by using the overall parity of the data bits of Byte A combined Sum Modulo 2 with position 0 of Byte B. In the same manner, it can be seen that check bit $C1_{TOTAL}$ of the entire computer word can be generated by combining, Sum Modulo 2, check bit C1 of Byte A and position 16 of Byte A with check bit C1 of Byte B and data position 16 of Byte B and position 0 of Byte B. The combination Sum Modulo 2 of check bits C1 and the associated byte position 16 cancels out the effect of making position 16 a special case in generation of the check bit C1 for each of the bytes. A comparison of FIGURES 4*a*, 4*b* and 4*c* readily indicates that check bits C2, C4 and C8 of the entire computer word may be generated directly from the check bits C2, C4 and C8 of each of the bytes. The formulas for the generation of check bits C0, C1, C16, C32 and CT of the entire computer word form the basis for the operation of the modifier 15 shown in FIGURES 1, 2 and will be discussed later.

Figures 5A, 5B:
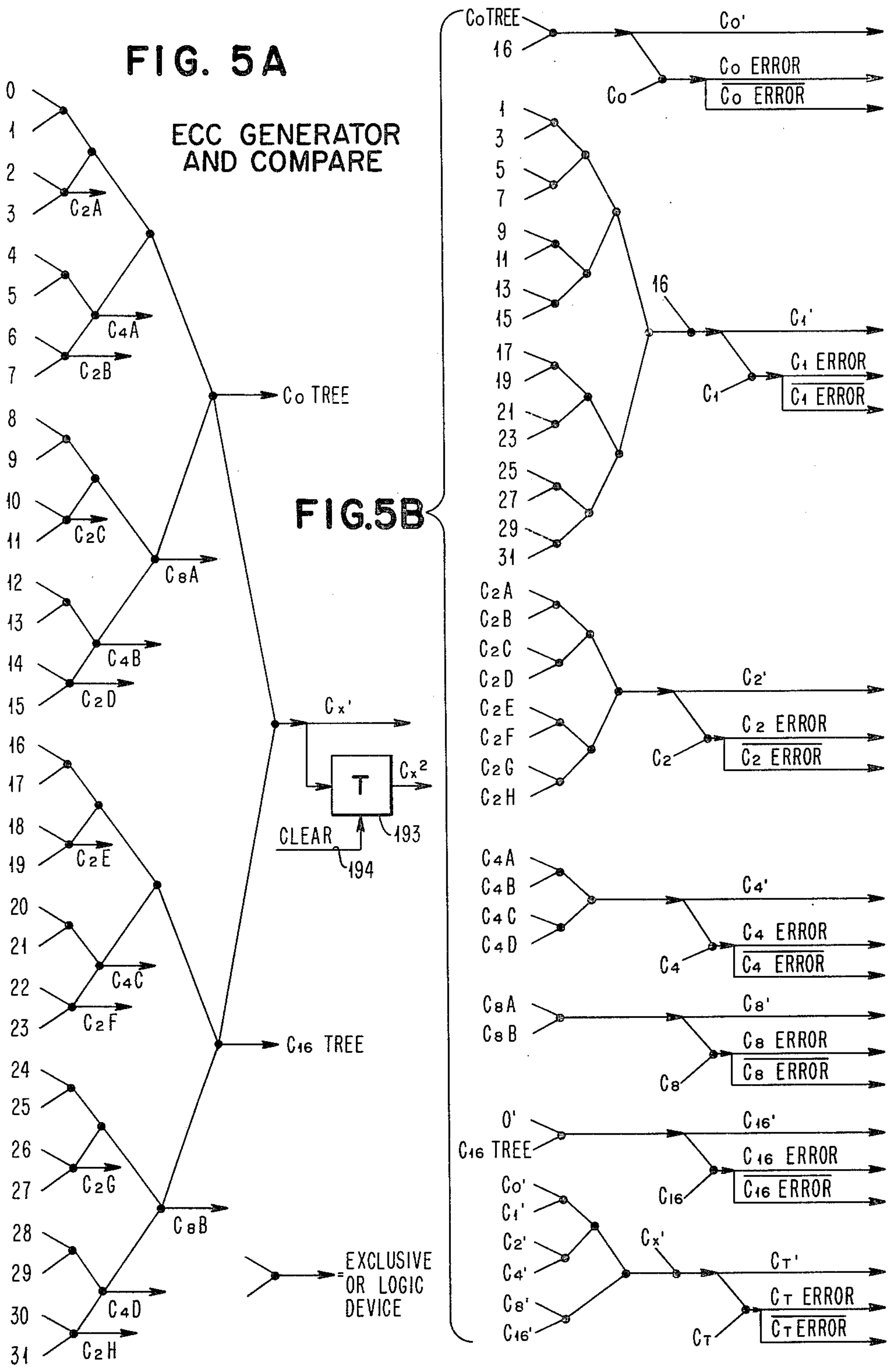
FIGURE 5 is a schematic representation of the logic required for generating the error correcting check bits for each byte of the computer word and the means for comparing the check bits generated from received data with the check bits which accompanied the received data.

*FIGURES 5a and 5b—ECC generator and compare*

In FIGURES 5*a* and 5*b*, and throughout the drawings, the convergence of two lines at a dot represents an exclusive-OR logic device. An exclusive-OR device will produce a binary 0 output when both inputs are binary 0 or both inputs are binary 1. The exclusive-OR device will provide a binary 1 output whenever only one of the converging lines is provided with a binary 1 signal.

FIGURE 5*a* shows a series of exclusive-OR devices which ultimately come together to provide as a final output a signal labeled CX′. CX′ represents an even parity of all of the data bits of a particular byte. The term "even parity" represents a condition wherein the data bits utilized to generate the parity contain an even number of binary 1's which results in a binary 0 output for the parity representation. By referring to FIGURE 5*a* in relationship to FIGURES 4*b* and 4*c*, it can be seen that certain combinations of data bits are utilized for generating certain of the byte check bits. Certain outputs of FIGURE 5*a* are utilized for generating these check bits. By referring to FIGURE 4*b* or 4*c*, it can be seen that check bit C2 is generated as the parity of data bits in positions 2 and 3, 6 and 7, 10 and 11, etc. These combinations of data bits are indicated in FIGURE 5*a* by the designation C2A, C2B, C2C, etc. In a like manner, certain information concerning check bit C8 is generated from the exclusive-OR arrangement of FIGURE 5*a*. For example, check bit C8 is generated by the parity of data bits 8 through 15 and data bits 24 through 31. The parity of these positions is taken off from exclusive-ORs which have been designated C8A and C8B.

The generation of the byte check bits is shown in FIGURE 5*b*. The generated check bits have been designated C0′, C1′, C2′ etc. The generation of C0′ is a result of taking the output from FIGURE 5*a* designated C0 TREE which is a parity of data bits 0 through 15 plus the binary value of position 16. In a like manner, the generated check bit C1′ is a parity arrangement of data positions 1, 3, 5, 7, etc., or all odd numbered data positions, plus the special case condition wherein data position 16 of each byte is utilized.

The generation of check bit C2′ is the result of exclusive-ORing outputs from FIGURE 5*a* labeled C2A, C2B through C2H. The exclusive-OR output of this combination results in generated C2′. The check bit C4′ is generated from outputs from FIGURE 5*a* which result in the exclusive-OR combination of data bits 4–7, 12–15, etc.

Check bit C8′ is generated from outputs from FIGURE 5*a* which is the exclusive-OR combination of data positions 8–15 and 24–31. C16′ is generated as a result of outputs from FIGURE 5*a* representing the exclusive-OR combination of data positions 16–31 labeled C16 TREE and position 0.

During a transfer from computer to storage, the check bit CT′, which is the overall parity of the data bits and check bits, is generated by utilizing the data parity designated CX′ exclusive-ORed with the exclusive-OR combination of all the generated check bits. During the read operation from storage to computer, CT′ is generated from CX′ and the check bits which accompanied the byte.

During the transfer of a computer word from the computer 10 to the storage device 14 as shown in FIGURE 1, the generated check bits C0′, C1′, C2′, etc. are gated by suitable means not shown to the byte register 12.

During the transfer of a computer word from the high capacity storage 14 to the computer 10, as represented in FIGURE 2, the generated check bits C0′, C1′, etc. are compared with the error correcting check bits C0, C1, C2, etc. which were received with the data elements from the high capacity storage 14. This is the function performed in FIGURE 2 by the ECC compare block 17. If the check bits generated from the data as received from the high capacity storage 14 do not agree with the check bit as sent from the high capacity storage, a logical binary 1 output will be produced from the exclusive-OR combination of the like check bits. The error condition has been designated in FIGURE *5b* as C0 Error, C1 Error etc. When the generated check bits C0', C1', etc. do compare with the transmitted check bits C0, C1 etc., a binary 1 output will be produced through suitable inverting means not shown on lines which have been labeled $\overline{\text{C0 Error}}$, $\overline{\text{C1 Error}}$, etc.

*FIGURES 6a, 6b and 6c—Error position*

The output of FIGURE *5b*, as a result of the compare operation shown in FIGURE 2, is sent to the error position decoder 18. The position decoder 18 of FIGURE 2 is shown in greater detail in FIGURES *6a*, *6b* and *6c*. As mentioned earlier, the combination of check bits C1, C2 and C4 are capable of identifying a particular bit of all the 8-bit sections which is in error. Further it was mentioned that the check bits C0, C8, C16 and CT were sufficient to identify a particular section of Byte A or B which has a bit in error. FIGURE *6a* shows the logic required for decoding the check bit combination produced as a result of the compare operation. A series of AND circuits 150–157 receive as logical inputs the permutations of binary zeros and binary ones which resulted from the compare operation of check bits C1, C2 and C4. This decoding operation in AND circuits 150–157 provides the indication of a particular column or data position in any of the 8-bit sections which is in error.

A series of AND circuits 161–165 provide logical outputs as a result of the permutation arrangement of check bits C0, C8, C16 and CT which resulted in the compare operation, described in connection with FIGURE *5b*. AND circuit 165 provides the indication as to whether or not a single error in Byte A or B has occurred in Section 5 which is the section that contains the check bits themselves. An OR circuit 166 provides one of the inputs to AND circuit 165. With the combination as shown, if C16 is not in error, CT is in error, C0 is not in error and C1, C2, C4, or C8 is in error. AND circuit 165 will provide an output indicating it is an error in Section 5. For any other combination of check bit errors when CT shows a single error, a special case results. If check bit C16 is in error or C0 is in error, the special case must be looked at to determine whether or not the error is actually in the check bit or in the data bits 0 or 16 of the byte. An inverter 167 provides a logical binary 1 output whenever there is not an error in Section 5. Another inverter 168 provides a logical binary 1 output when check bits C1, C2, C4 and C8 are not in error.

FIGURE *6b* shows a matrix of AND circuits which receive as inputs the Column and Section outputs from FIGURE *6a*. In addition, certain other check bit error conditions are received at AND circuits 170, 171 and 172 to cause correction of position 0 or position 16. Whenever position 0 or position 16 is in error, AND circuit 170 will provide an output indicating that check bits C16, CT and C0 are in error. To determine whether position 0 or position 16 should be inverted, the check bit C1 will provide the necessary indication. AND circuit 171 will be energized to cause inversion of position 16 whenever C1 is in error. If all other conditions are satisfied and check bit C1 is not in error, AND circuit 172 will be energized to cause position 0 to be inverted. All other data bits 1–15 and 17–31 are inverted through the logical combination of Column and Section inputs to the AND circuit matrix.

In FIGURE *6c* a logical combination is made in AND circuits 175–178 to provide correction of check bits C1, C2, C4 and C8. An AND circuit 179 provides the required signal to invert check bit C16. When there is a CT Error and an error in check bit C16 but none of the other check bits is in error, an indication is then given by AND circuit 179 that it is check bit C16 that is in error and therefore should be inverted.

When the overall parity CT is in error, an AND circuit 180 and an AND circuit 181 are utilized to indicate whether or not the error is a result of check bits or data bits being in error or if the error is the CT check bit itself. While it is not necessary to actually correct the check bit CT, an indication as to whether or not the error is in the check bits or the data bits is utilized in the modifier 15 shown in FIGURE 2. When all of the check bits are not in error an output from AND circuit 180 will be applied at AND circuit 181. If there is an indication that check bit CT is in error, AND circuit 181 will provide a logical output which has been labeled Invert CT. This output is not used to directly affect the setting of the check bit CT in the byte register 12 of FIGURE 2, but is utilized in the modifier 15 to generate the parity CX for the data bits only of each of the bytes.

*FIGURE 7—Modifier*

The modifier 15 of FIGURES 1 and 2 is shown in greater detail in FIGURE 7. It is the modifier which provides the logic necessary to perform the functions shown by the equations on FIGURE 4. An AND circuit 190, an OR circuit 191, an inverter 199 and an AND circuit 192 are utilized to generate the overall parity of the data bits represented by the symbol CX in the equations of FIGURE 4. To alleviate the necessity for generating a new CX for the data bits after they have been corrected in the byte register 12, the originally generated CX' is stored in a trigger 193 shown in FIGURE *5a*. The trigger 193 is cleared by an input on line 194 prior to receiving each of the bytes. The output $CX^2$ of trigger 193 in FIGURE *5a* is utilized in the modifier shown in FIGURE 7. The logic circuits 190, 191, 199 and 192 make the logical decision as to whether or not the CT ERROR was the result of a data bit error or check bit error. If the CT ERROR was the result of one of the check bits being in error, there is no need to affect the originally generated $CX^2$ as the data bits have produced the proper parity. AND 190 provides an output indicating that C0 was the single error. The inverted output of OR 191 shows when the single error was caused by C0, C16 or CT. AND 192 thus produces an output under single error conditions (CT ERROR) only when the error was not caused by check bits. The originally generated signal $CX^2$ is combined in an exclusive-OR circuit with the logical output to provide a corrected overall parity CX of the data bits only. This provides a slightly faster operation over having to regenerate the check bit CX after the data bits have been corrected if there has been an error.

The AND circuits 195–198 and associated exclusive-OR logic devices are utilized to generate the signals for the equations shown in FIGURE *4a*. A distinction is made at the AND circuits 195–198 between an operation concerned with Byte A or Byte B as indicated by binary 1 signals on either line 199 or 200. The remaining inputs to the AND circuits 195–198 and the exclusive-OR logic devices shown are the corrected data bits and check bits from the byte register 12 shown in FIGURE 2. Before explaining the use of the signals C0 MOD, C1 MOD, etc generated from FIGURE 7, an explanation of the operation of the ECC accumulator 16 of FIGURES 1 and 2 will be explained.

*FIGURE 8—ECC accumulator*

The ECC accumulator shown in FIGURE 8 is essentially a series of bistable trigger devices 210–217. The triggers 210–216 receive complementing inputs from a series of OR circuits 220–226. The inputs applied to the complementing inputs of the triggers 210–217 has the affect of providing a Sum Modulo 2 or exclusive-OR addition of binary information sequentially applied. Thus, if a particular trigger is in a first stable state indicating a binary 1 or binary 0, a binary 0 input will leave the trigger unchanged. A binary 1 input to the complement input will, however, change the trigger to the opposite stable state to indicate a binary 0 or 1 respectively.

When the check bits for each of the bytes has been generated as in FIGURE 1 or when the check bits have been corrected in the byte register 12 of FIGURE 2, the byte check bits are sent either in the direct form or modified form to the ECC accumulator 16. The series of AND circuits 230–237 provide the complementing inputs to triggers 210–217 respectively. Triggers 212, 213 and 214 receive their inputs directly from the byte register 12. The inputs to triggers 210, 211, 215, 216 and 217 are received from the modifier shown in FIGURE 7.

Taking the generation of the check bit C0 as an example, reference to FIGURES 7 and 8 will show the sequence of inputs to trigger 210 through OR circuit 220 and AND circuit 230. For Byte A, AND circuit 230 will receive as an input the signal generated by AND circuit 195 in FIGURE 7. AND circuit 195 provides the binary information indicating the overall parity CX of data bits for Byte A. The operation of the modifier in FIGURE 7 during Byte B provides a signal from AND circuit 196, which is applied to AND circuit 230 of FIGURE 8 indicating the corrected binary condition of position 0 of Byte B. The sequential application of these signals from AND circuit 230 to the trigger 210, applied as complementing inputs, produces the equation for check bit $C0_{TOTAL}$ for the entire computer word shown in FIGURE 4.

By referring to the equation for check bit $C1_{TOTAL}$ for the entire computer word shown in FIGURE 4, it can be seen that the Sum Modulo 2 addition of the check bit C1 from both Byte A and Byte B, the corrected information from position 16 of both Byte A and Byte B, and the corrected indication for information position 0 of Byte B only will produce $C1_{TOTAL}$. For Byte A, AND circuit 231 of FIGURE 8 will receive as an input the exclusive-OR combination of the corrected check bit C1 and information position 16, the output of AND circuit 196 being 0 as a result of operation on Byte A. During the operation on Byte B, however, the exclusive-OR combination of check bit C1, corrected data positions 16, and the corrected information from data position 0 of Byte B are combined in the exclusive-OR combination to provide an input to AND circuit 231. Applying the output of AND circuit 231 sequentially to trigger 211 results in the combined Sum Modulo 2 addition called for in the equation for check bit $C1_{TOTAL}$ of the entire computer word.

The equation for the check bit CT for the entire computer word is shown in FIGURE 4. The check bit CT for the entire computer word includes the parity of all the data bits plus the check bits for the entire computer word. The entire equation for check bit CT would include the term CX from both Bytes A and B plus the check bits C0 and C32 of the entire computer word. This term however can be simplified to that shown by the equation in FIGURE 4. The generation of check bit CT for the entire computer word is done in the modifier shown in FIGURE 7 and is the result of exclusive-ORing corrected data position 0 of both bytes, the check bits C2, C4 and C8 directly from the byte register 12 with the check bits C1 and C16 as modified. This signal from the modifier of FIGURE 7 is applied to AND circuit 237 of FIGURE 8 as the complementing input to trigger 217, providing the proper binary output from trigger 217 indicating the overall parity of the computer word including the check bits.

During the operation shown in FIGURE 1 wherein the computer word is being sent to the high capacity storage 14, a comparison is made between the byte check bits as combined in the ECC accumulator 16 with the check bits originally accompanying the computer word in the word register 11. The comparison of the original check bits and the modified check bits is made in triggers 210–216 by applying complementing signals through OR circuits 220–226 from AND circuits 240–246. Once the byte check bits have been combined in triggers 210–216, AND circuits 240–246 are sampled thus entering the original check bits from word register 11 of FIGURE 1 into the triggers 210–216 at their complement inputs. If the combined byte check bits correspond to the original check bits from the word register 11, all of the triggers 210–216 will provide a binary 0 output. This condition is indicated at an OR circuit 247. If any one of the triggers 210–216 remain in the binary 1 condition, an error signal will be generated from OR circuit 247. This error signal may be utilized in the computer system to initiate a re-transmission of the entire computer word or other programming logic.

In the operation as shown in FIGURE 2, when both Byte A and Byte B have been received and their accompanying check bits corrected and modified and applied to the triggers 210–217, the contents of triggers 210–217 will represent the proper check bits for the entire computer word. These check bits are gated to the word register 11 by sampling the trigger contents through a series of AND circuits 250–257.

As mentioned previously in connection with FIGURE 3, added reliability may be provided by thereafter checking that proper transfer has been made between byte register 12 and the word register 11 and from the check bit accumulator 16 to the word register 11.

There has thus been shown a Hamming coding technique and system providing transfer of a computer word on a byte basis wherein each of the bytes transferred has associated therewith error correcting check bits. Added flexibility arises from the coding scheme in that a symmetry exists between the check bits and data bits of the bytes such that a logical combination of the check bits for each of the bytes results in a set of check bits which are proper to provide error correcting properties to the entire computer word assembled from the sequentially received bytes.

While the invention has been particularly shown and described with reference to a preferred embodiment thereof, it will be understood by those skilled in the art that various changes in form and details may be made therein without departing from the spirit and scope of the invention.

We claim:

1. In a data transfer system for the assembly of elements of a permutation code group including a subgroup giving error detecting and error correcting properties to the code group, the combination comprising:

means for sequentially receiving a portion of the permutation code group and an associated operand, said operand giving error detecting and correcting properties to the associated portion of the code group;

means responsive to each of said portions and operands as received to correct errors in said portions or operands as received;

means to transfer and assemble said portions to form the permutation code group;

and means to combine said operands of all said portions to form said subgroup for inclusion with the assembled permutation code group.

2. In a data transfer system for the assembly of a code group including a plurality of information elements and a plurality of check bits giving error detecting and error correcting properties to the code group, the combination comprising:

means for periodically receiving and storing a portion of the code group information elements and an associated plurality of check bits, said check bits giving error detecting and correcting properties to the associated portion of the code group;

means responsive to the information elements and associated check bits of each of said portions as received in said storage means to correct errors in said portions;

code group storage means;

means for transferring the information elements of said portions as corrected from said portion storage means to said code group storage means to form the code group;

and means to combine said check bits of all said portions to form said plurality of check bits for inclusion with the assembled code group.

3. In a data transfer system for the assembly of a code group including a plurality of information elements and a plurality of check bits wherein said code group consists of $k$ subgroups, each subgroup of said code group consisting of $m$ information elements and wherein said check bits consist of $l$ check bits where $2^l \geqq k$ and $n$ check bits where $2^n \geqq m$, said check bits giving error correcting properties to the code group, the combination comprising:

means for periodically receiving and storing a submultiple number $s$ of said $k$ subgroups and an associated plurality of check bits including $n$ check bits and $t$ check bits where $2^t \geqq s$, said check bits giving error correcting properties to the $s$ subgroups;

means responsive to the information elements and associated check bits of each of said $s$ subgroups as received in said storage means to correct errors in said subgroups;

code group storage means;

means for transferring said $s$ subgroups as corrected from said $s$ subgroup storage means to corresponding positions of said code group storage means to form the code group;

and means to combine said check bits of all said $s$ subgroups to form said $l$ and $n$ check bits included with the assembled code group.

4. In a data transfer system for the assembly of a code group including a plurality of information elements and a plurality of check bits wherein said code group consists of $k$ subgroups, each subgroup consisting of $m$ information elements and wherein said check bits of said code group consist of $l$ check bits where $2^l \geqq k$ and $n$ check bits where $2^n \geqq m$, said check bits giving error correcting properties to the code group, the combination comprising:

means for periodically receiving and storing a submultiple number $s$ of said $k$ subgroups and an associated plurality of check bits including $n$ checks bits and $t$ check bits where $2^t \geqq s$, said check bits giving error correcting properties of the $s$ subgroups;

means responsive to the information elements and associated check bits of each of said $s$ subgroups as received in said storage means to correct single errors in said subgroups;

code group storage means;

means for transferring said $s$ subgroups as corrected from said $s$ subgroup storage means to corresponding positions of said code group storage means to form the code group;

and means to combine Sum Modulo 2 said check bits of all said $s$ subgroups to form said $l$ and $n$ check bits included with the assembled code group.

5. In a data transfer system for the assembly of a code group including a plurality of information elements and a plurality of check bits wherein said code group consists of $k$ subgroups, each subgroup consisting of $m$ information elements and wherein said check bits of said code group consist of $l$ check bits where $2^l \geqq k$ and $n$ check bits where $2^n \geqq m$, said check bits giving error correcting properties to the code group, the combination comprising:

means for periodically receiving and storing a submultiple number $s$ of said $k$ subgoups and an associated plurality of check bits including $n$ check bits and $t$ check bits where $2^t \geqq s$, said check bits giving error correcting properties to the $s$ subgroups;

means responsive to the information elements and associated check bits of each of said $s$ subgroups as received in said storage means to correct single errors in said subgroups;

code group storage means;

means for transferring said $s$ subgroups as corrected from said $s$ subgroup storage means to corresponding positions of said code group storage means to form the code group;

and means responsive to the corrected information elements and associated check bits of each of said $s$ subgroups periodically received in said $s$ subgroup storage means to combine said check bits of all said $s$ subgroups to form said $l$ and $n$ check bits included with the assembled code group.

6. In a data transfer system for the assembly of a code group including a plurality of information elements and a plurality of check bits wherein said code group consists of $k$ subgroups, each subgroup consisting of $m$ information elements and wherein said check bits of said code group consist of $l$ check bits where $2^l \geqq k$ and $n$ check bits where $2^n \geqq m$, said check bits giving error correcting properties to the code group, the combination comprising:

means for periodically receiving and storing a submultiple number $s$ of said $k$ subgroups and an associated plurality of check bits including $n$ check bits and $t$ check bits where $2^t \geqq s$, said check bits giving error correcting properties to the $s$ subgroups;

means responsive to the information elements and associated check bits of each of said $s$ subgroups as received in said storage means to correct any single error in said subgroups;

code group storage means;

means for transferring said $s$ subgroups as corrected from said $s$ subgroup storage means to corresponding positions of said code group storage means to form the code group;

check bit storage means having a plurality of bistable devices corresponding to said $l+n$ check bits;

and means responsive to the corrected information elements and check bits of each of said $s$ subgroups periodically received at said $s$ subgroup storage means for forming, by Sum Modulo 2 addition, said $l+n$ check bits in related ones of said bistable devices.

7. In a system for transferring by portions all of a complete permutation code group wherein the portions and the complete code group have associated therewith permutation operands giving error detecting and correcting properties thereto, the combination comprising:

means for generating an error correcting operand for transfer with each portion of the code group;

means for combining each of the portions' operands as transferred;

and comparing means responsive to the operand of the complete code group and the combined operands of the portions for producing an error indication upon a non-comparison.

References Cited by the Examiner

UNITED STATES PATENTS

| | | | |
|---|---|---|---|
| Re. 23,601 | 12/1952 | Hamming et al. | 340—146.1 |
| 2,919,854 | 1/1960 | Singman | 340—146.1 |
| 3,045,209 | 7/1962 | Pomerene | 235—153 X |

ROBERT C. BAILEY, *Primary Examiner.*

MALCOLM A. MORRISON, *Examiner.*